United States Patent
Morita et al.

(10) Patent No.: US 12,166,179 B2
(45) Date of Patent: Dec. 10, 2024

(54) METHOD FOR PRODUCING ALL SOLID STATE BATTERY

(71) Applicant: TOYOTA JIDOSHA KABUSHIKI KAISHA, Toyota (JP)

(72) Inventors: Keisuke Morita, Susono (JP); Chihiro Yada, Susono (JP); Yushi Suzuki, Mishima (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/456,701

(22) Filed: Aug. 28, 2023

(65) Prior Publication Data

US 2023/0411699 A1 Dec. 21, 2023

Related U.S. Application Data

(63) Continuation of application No. 17/476,156, filed on Sep. 15, 2021, now Pat. No. 11,784,351.

(30) Foreign Application Priority Data

Sep. 23, 2020 (JP) ................. 2020-158403
Jan. 25, 2021 (JP) ................. 2021-009292

(51) Int. Cl.
  *H01M 10/058* (2010.01)
  *H01M 10/0562* (2010.01)
  *H01M 50/403* (2021.01)
(52) U.S. Cl.
  CPC ..... *H01M 10/058* (2013.01); *H01M 10/0562* (2013.01); *H01M 50/403* (2021.01)
(58) Field of Classification Search
  CPC ........... H01M 10/058; H01M 10/0562; H01M 50/403
  See application file for complete search history.

(56) References Cited

U.S. PATENT DOCUMENTS

| | | |
|---|---|---|
| 2015/0380763 A1 | 12/2015 | Ohtomo et al. |
| 2018/0205112 A1 | 7/2018 | Thomas-Alyea et al. |

(Continued)

FOREIGN PATENT DOCUMENTS

| | | |
|---|---|---|
| CN | 109390552 A | 2/2019 |
| JP | 2011-086556 A | 4/2011 |

(Continued)

OTHER PUBLICATIONS

Notice of Allowance dated Jun. 7, 2023, issued in U.S. Appl. No. 17/476,156.

*Primary Examiner* — Sarah A. Slifka
(74) *Attorney, Agent, or Firm* — Sughrue Mion, PLLC

(57) ABSTRACT

A method for producing an all solid state battery using a precipitation-dissolution reaction of metallic Li as a reaction of an anode, includes a preparation step, a liquid composition preparation step, a coating layer formation step, and a separator formation step. The preparation step includes preparing a sulfide solid electrolyte represented by $Li_{7-a}PS_{6-a}X_a$ (X is at least one of Cl, Br, and I, and a satisfies $0 \leq a \leq 2$), the liquid composition preparation step includes dissolving the sulfide solid electrolyte in an alcohol-based solvent to prepare a liquid composition, the coating layer formation step includes applying the liquid composition to an anode current collector to form a coating layer, the separator formation step includes forming a separator by volatilizing the alcohol-based solvent from the coating layer by drying, and the ratio of the sulfide solid electrolyte contained in the liquid composition is 10% by weight to 30% by weight.

3 Claims, 2 Drawing Sheets

(56) References Cited

U.S. PATENT DOCUMENTS

| | | |
|---|---|---|
| 2019/0051925 A1 | 2/2019 | Li et al. |
| 2021/0280842 A1 | 9/2021 | Shin et al. |
| 2022/0093961 A1 | 3/2022 | Morita |

FOREIGN PATENT DOCUMENTS

| | | |
|---|---|---|
| JP | 2015-002079 A | 1/2015 |
| JP | 2016-012495 A | 1/2016 |
| JP | 2020-61326 A | 4/2020 |
| KR | 10-2018-0009854 A | 1/2018 |
| KR | 10-2018-0084681 A | 7/2018 |
| KR | 10-2019-0048265 A | 5/2019 |

METHOD FOR PRODUCING ALL SOLID STATE BATTERY

TECHNICAL FIELD

This application is a continuation of U.S. application Ser. No. 17/476,156, filed Sep. 15, 2021 (U.S. Pat. No. 11,784,351 issued on Oct. 10, 2023), which claims the benefit of Japanese Patent Application Nos. 2020-158403, filed Sep. 23, 2020 and 2021-009292 filed Jan. 25, 2021. The present disclosure relates to a method for producing an all solid state battery.

BACKGROUND

An all solid state battery is a battery having separators (solid electrolyte layers) between the cathode layer and the anode layer, and has advantages of simplifying the safety device as compared with a liquid battery having an electrolyte containing combustible organic solvents.

For example, Patent Literature 1 discloses a lithium-solid secondary battery in which a green compact of sulfide solid electrolyte is formed on an anode current collector. In this battery, metallic Li is precipitated and dissolved between the anode current collector and the compact as a reaction of an anode.

PRIOR ART DOCUMENTS

[Patent Document 1] JP-A-2016-012495

SUMMARY

Problem to be Solved

In a battery utilizing precipitation-dissolution reactions of metallic Li, it is essential to suppress the generation of short circuits due to dendrites. Here, if the filling ratio of the separator separating the cathode and anode current collector is low, dendrites tend to grow along the grain boundaries and voids are created between the particles in the separator, so that occurrence of short circuits may not be sufficiently suppressed.

The present disclosure has been made in view of the above circumstances, and a main object of the present disclosure is to provide a method for manufacturing an all solid state battery having separators having a high packing ratio.

Means for Solving the Problem

In order to solve the above problem, in the present disclosure, there is provided a method for producing an all solid state battery. A method for producing an all solid state battery using a precipitation-dissolution reaction of metallic Li as a reaction of an anode, comprises a preparation step, a liquid composition preparation step, a coating layer formation step, and a separator formation step, wherein the preparation step is a step of preparing a sulfide solid electrolyte represented by $Li_{7-a}PS_{6-a}X_a$ (X is at least one of Cl, Br, and I, and a satisfies $0 \leq a \leq 2$), the liquid composition preparation step is a step of dissolving the sulfide solid electrolyte in an alcohol-based solvent to prepare a liquid composition, the coating layer formation step is a step of applying the liquid composition to an anode current collector to form a coating layer, the separator formation step is a step of forming a separator by volatilizing the alcohol-based solvent from the coating layer by drying, and the ratio of the sulfide solid electrolyte contained in the liquid composition is 10% by weight or more and 30% by weight or less.

According to the present disclosure, since a predetermined liquid composition is used, an all solid state battery provided with a separator having a high filling ratio can be manufactured.

In the above disclosure, the above sulfide solid electrolyte may be a sulfide glass.

In the above disclosure, the variable "a" may be 2.

In the above disclosure, the variable "X" may be at least I.

In the above disclosure, the above alcohol-based solvent may contain ethanol.

In the above disclosure, in the separator formation step, a drying pressure may be a normal pressure, a drying temperature may be $(T_B+10°)$ C or less when a boiling point of the alcohol-based solvent is regarded as $T_B°$ C., and a drying time may be a time until a residual solvent of the alcohol-based solvent becomes 0.53% by weight or less.

Effect of the Invention

In the present disclosure, it is advantageous to be able to produce an all solid state battery with high-fill separators.

DESCRIPTION

A method for producing an all solid state battery in the present disclosure will be described in detail.

Figure 1:
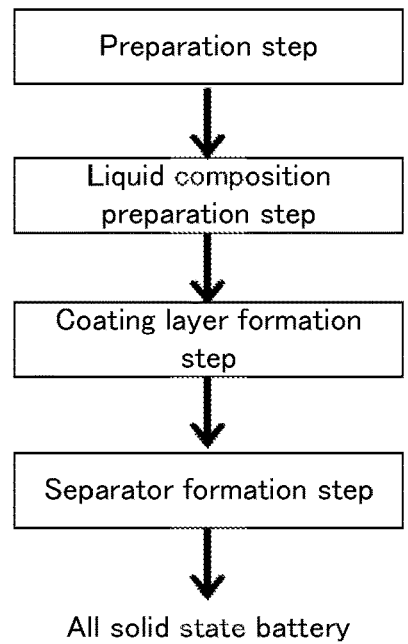
FIG. 1 is a flow diagram illustrating an exemplary method for producing an all solid state battery in the present disclosure.

FIG. 1 is a flowchart showing an exemplary method for manufacturing an all solid state battery according to the present disclosure. In FIG. 1, first, a sulfide solid electrolyte represented by $Li_{7-a}PS_{6-a}X_a$ is prepared (X is at least one of Cl, Br, and I, and a satisfies $0 \leq a \leq 2$) (preparing step). Next, a liquid composition is prepared by dissolving sulfide solid electrolyte in an alcohol-based solvent (liquid composition preparation step). Next, the above liquid composition is applied to an anode current collector to form a coating layer (coating layer formation step). Then, a separator is formed by volatilizing an alcohol-based solvent from the coating layer by drying (separator formation step). In addition, the ratio of sulfide solid electrolyte contained in the liquid composition is within a predetermined range.

According to the present disclosure, since a predetermined liquid composition is used, an all solid state battery provided with a separator having a high filling ratio can be manufactured.

As in Patent Literature 1 described above, in an all solid state battery utilizing a precipitation-dissolution reaction of metallic Li, it is known to form a green compact of sulfide solid electrolyte on an anode current collector as a separator. Since such compacts are formed by compacting particulate solid electrolyte, grain boundaries and gaps between particles are generated, and there are limitations in raising the packing rate. Further, in order to improve the filling rate of the green compact, increasing the press pressure and press temperature or performing sintering are conceivable, but mass productivity is lowered. On the other hand, in the present disclosure, a predetermined liquid composition containing sulfide solid electrolyte in a predetermined range is used. In such a liquid composition, the proportion of undissolved sulfide solid electrolyte is small. Therefore, in the separator obtained by coating and drying this liquid composition, there is no grain boundary of sulfide solid electrolyte and a higher filling ratio is obtained. Therefore, in all solid state battery having such separators, the number of voids in which dendrites can grow is small, so that the generation of short-circuiting can be further suppressed. In addition, when the packing ratio of the separator is high, it is possible to suppress invasive precipitation of the metal Li in the voids in the separator, so that it is possible to satisfactorily precipitate and dissolve the metal Li on the current collector. Consequently, battery characteristics such as cyclic characteristics are also good.

1. Preparation Step

The preparation step in the present disclosure is a step of preparing a sulfide solid electrolyte represented by $Li_{7-a}PS_{6-a}X_a$, where "X" is at least one of Cl, Br, and I, and "a" satisfies $0 \leq a \leq 2$.

In $Li_{7-a}PS_{6-a}X_a$, "X" is at least one of Cl, Br, and I. "X" may be only Cl, may be only Br, and may be only I. Further, "X" may be 2 or more of Cl, Br and I. In particular, "X" is preferably at least I.

Further, in $Li_{7-a}PS_{6-a}X_a$, "a" satisfies $0 \leq a \leq 2$. "a" may be 0 or greater than 0. In the latter case, "a" may be 0.5 or more, and may be 1.0 or more. On the other hand, "a" is 2 or less, and may be 1.5 or less. When "a" is 2, the filling rate is likely to be improved.

Sulfide solid electrolyte in this disclosure may be a sulfide glass, may be a glass ceramic, and may be a crystalline material. When the sulfide solid electrolyte is sulfide glass, it is easily dissolved in an alcohol-based solvent to be described later.

In the preparation step, the above-described sulfide solid electrolyte may be purchased and prepared, and may be synthesized and prepared. When sulfide glasses are synthesized as sulfide solid electrolyte, they can be obtained, for example, by subjecting the raw material composition to an amorphization treatment. The raw material composition contains $Li_2S$, $P_2S_5$ and LiX. "X" is as described above. Examples of LiX include LiI, LiCl and LiBr. Incidentally, it is $3.5((1-\alpha)Li_2S \cdot \alpha LiX) \cdot 0.5P_2S_5 \rightarrow Li_{7-3\alpha}PS_{6-3.5\alpha}X_{3.5\alpha}$; thus, when $a = 3.5\alpha$, it is $Li_{7-a}PS_{6-a}X_a$.

Examples of the amorphization process include mechanical milling such as a ball mill, a vibration mill, a turbo mill, mechanofusion, and a disk mill. Of these, a ball mill is preferred, and particularly a planetary ball mill is preferred. The mechanical milling may be dry mechanical milling or wet mechanical milling.

When glass ceramics are synthesized, it can be obtained by heat-treating the above-mentioned sulfide glass. In addition, when a crystalline material is synthesized, it can be obtained, for example, by subjecting the raw material composition to a solid phase reaction treatment. In addition, when sulfide solid electrolyte in the present disclosure has a crystal phase, that crystal phase is preferably an argyrodite type.

It is preferable that the sulfide solid electrolyte has high ionic conductivity. Ion conductivity at 25° C. is, for example, $10^{-4}$ S/cm or more and may be $10^{-3}$ S/cm or more. The shape of sulfide solid electrolyte is not particularly limited, and examples thereof include particulate. The average particle size $D_{50}$ of sulfide solid electrolyte is, for example, 0.1 μm or more and 50 μm or less. The average particle size can be determined, for example, from the results of particle size distribution measurement by laser diffraction scattering method.

2. Liquid Composition Preparation Step

The liquid composition preparation step in the present disclosure is a step of dissolving the above sulfide solid electrolyte in an alcohol-based solvent to prepare a liquid composition. In addition, the ratio of sulfide solid electrolyte contained in the liquid composition is 10% by weight or more and 30% by weight or less.

Alcohol-based solvents have a high solubility in sulfide solid electrolyte (sulfide solid electrolyte represented by $Li_{7-a}PS_{6-a}X_a$) and can dissolve a large amount of sulfide solid electrolyte. Further, since the alcohol-based solvent has a relatively low boiling point, it is easy to remove the alcohol-based solvent. Further, the alcohol-based solvents hardly cause degradation of the above sulfide solid electrolyte due to dissolution.

The type of the alcohol-based solvent is not particularly limited, and examples thereof include a primary alcohol. The number of carbon atoms of the alcohol-based solvent is, for example, 1 or more and 6 or less, and may be 1 or more and 3 or less. Specific examples of the alcohol-based solvent include ethanol, methanol and propanol, for example. The alcohol-based solvent may be used alone, or 2 or more of them may be used in combination. In particular, the alcohol-based solvent in the present disclosure is preferably a solvent containing ethanol as a main component. The ratio of ethanol to the entire alcohol-based solvent is, for example, 50% by weight or more, and may be 70% by weight or more, and may be 90% by weight or more.

The ratio of the above sulfide solid electrolyte contained in the above liquid composition is usually 10% by weight or more, and may be 15% by weight or more. On the other hand, the ratio of the above sulfide solid electrolyte contained in the above liquid composition is usually 30% by weight or less, and may be 25% by weight or less, and may be 20% by weight or less. If the ratio of the above sulfide solid electrolyte is too low or too high, a satisfactory filling ratio may not be obtained in some cases.

In addition, the liquid composition may contain only the above sulfide solid electrolyte as a solid content, and may contain other materials in addition to the above sulfide solid electrolyte. The ratio of the above sulfide solid electrolyte to the total solid content is, for example, 50% by weight or more, and may be 70% by weight or more, and may be 90% by weight or more. On the other hand, the above ratio is, for example, 99% by weight or less, and may be 95% by weight or less. Examples of other materials include solid electrolyte and binders other than sulfide solid electrolyte in the present disclosure described above.

Sulfide solid electrolyte contained in the liquid composition may be completely dissolved in an alcohol-based solvent. On the other hand, a part of the sulfide solid electrolyte contained in the liquid composition may not be dissolved in an alcohol-based solvent. In this instance, a portion of sulfide solid electrolyte is present in suspension in alcohol-based solvents.

The liquid composition is prepared by mixing the above sulfide solid electrolyte with the above alcohol-based solvents. The mixing method includes, for example, an ultrasonic homogenizer, a shaker, a thin film swirl mixer, a dissolver, a homomixer, a kneader, a roll mill, a sand mill, an attritor, a ball mill, a vibrator mill, and a high-speed impeller mill.

3. Coating Layer Formation Step

The coating layer formation step in the present disclosure is a step of forming a coating layer by applying the above liquid composition to an anode current collector.

Since the liquid composition is the same as that described above, description thereof will be omitted here. The anode current collector may be similar to the anode current collector commonly used in all solid state battery. Examples of the material of the anode current collector include SUS, copper, nickel, and carbon. Methods of coating the liquid composition include, for example, a doctor blade method, a die coat method, a gravure coat method, a spray coating method, a static coating method, and a bar coating method. The thickness of the coating layer is not particularly limited, and can be appropriately adjusted so as to obtain a desired thickness of the separators.

4. Separator Formation Step

The separator formation step in the present disclosure is a step of forming a separator by volatilizing the above-mentioned alcohol-based solvent from the above coating layer by drying.

In the separator formation step, the above alcohol-based solvents are volatilized from the above coating layer by drying. Thus, the alcohol-based solvent can be removed from the coating layer, and sulfide solid electrolyte can be redeposited. The drying method is not particularly limited as long as the above-mentioned alcohol-based solvent can be volatilized, and examples thereof include general methods such as warm air and hot air drying, infrared drying, vacuum drying, and dielectric heating drying.

A drying pressure (pressure during drying) may be a normal pressure and may be a reduced pressure, but the former is preferred. If it is a normal pressure, occurrence of bumping of the alcohol-based solvent during drying can be inhibited, and generation of voids inside the separator can be inhibited. As a result, a separator with high filling ratio can be obtained. The normal pressure refers to an atmospheric pressure, and it is typically 1 atm, but the pressure of 0.5 atm or more and 1.5 atm or less is acceptable. On the other hand, in the latter case, the drying pressure is, for example, 0.01 atm or less.

Further, examples of the dry atmosphere include an inert gas atmosphere such as an Ar gas atmosphere and a nitrogen gas atmosphere, an air atmosphere, and a vacuum. A gas such as an inert gas may be allowed to flow during drying. The drying temperature is not particularly limited, but is preferably a temperature at which sulfide solid electrolyte does not deteriorate. When the boiling point of the alcohol-based solvent is regarded as $T_B°$ C., the drying temperature is, for example, preferably ($T_B+10°$) C or less, and more preferably $T_B°$ C. or less. If the drying temperature is too high, bumping of the alcohol-based solvent during drying would easily occur, and thus the flow rate when the solvent vapor escapes from the separator would increase to easily generate voids and defects. As a result, the filling ratio may easily decrease. On the other hand, by setting the drying temperature to not more than the vicinity of the boiling point of the alcohol-based solvent, the bumping of the alcohol-based solvent during drying would not easily occur. Furthermore, the drying temperature is, for example, preferably ($T_B-30°$) C or more, and more preferably ($T_B-20°$) C or more. If the drying temperature is too low, the alcohol-based solvent would easily remain after drying, and there may be a case where the Li ion conductivity of the separator decreases. Also, if the drying temperature is too low, drying would take time and there may be a case where productivity drops.

In the separator formation step, all of the alcohol-based solvents may be substantially volatilized and removed from the coating layer, and a part thereof may be volatilized and removed, but the former is preferred. A drying time is not particularly limited, but may be a time until the residual solvent of the alcohol-based solvent becomes, for example, 5.1% by weight or less, may be 2.1% by weight or less, and may be 0.53% by weight or less. The less the residual solvent becomes, the more the Li ion conductivity of the separator easily improves. The drying time is, for example, 10 minutes or more, and may be 30 minutes or more. Meanwhile, the drying time is, for example, 10 hours or less, may be 5 hours or less, and may be 2 hours or less.

Sulfide solid electrolyte contained in the separator after drying may be a sulfide glass, a glass ceramic, or a crystalline material. If the above sulfide solid electrolyte has a crystal phase, that crystal phase is preferably argyrodite type. The thickness of the separator is not particularly limited, but is, for example, 15 μm or less, and may be 10 μm or less. On the other hand, the thickness of the separator is, for example, 0.5 μm or more, and may be 1 μm or more, and may be 5 μm or more. If the thickness of the separators is too large, the reversibility of the precipitation-dissolution reactions of metallic Li becomes low, and battery performance such as cycling characteristics may be deteriorated. On the other hand, if the thickness of the separator is too small, the occurrence of a short circuit may not be effectively suppressed in some cases. The thickness of the separator can be adjusted, for example, by changing the coating amount of the liquid composition.

Also, the filling ratio of the separator is, for example, 94% or more, may be 96% or more, and may be 98% or more. Further, the Li ion conductivity of the separator at 25° C. is, for example, 0.1 mS/cm or more, may be 0.2 mS/cm or more, and may be 0.3 mS/cm or more.

5. Other Steps

In the present disclosure, a separator disposed between a cathode layer and an anode layer may be formed by performing only the separator formation step described above, and may be formed by further performing other steps. In the latter case, the "separator formation step" described above can be referred to as a "first separator formation step". The first separator is formed by the first separator formation step. On the other hand, another step may be referred to as, for example, a "second separator formation step", and a second separator is formed by the second separator formation step. The second separator formation step is, for example, a step of forming a green compact of the above sulfide solid electrolyte. The second separator is preferably disposed between the first separator and cathode layers. By forming the second separator in addition to the first separator, the thickness of the entire separator can be easily improved as compared with the case where only the first separator is formed. The thickness of the second separator is, for example, 0.1 μm or more and 1000 μm or less.

The present disclosure may further include a cathode formation step of forming a cathode having a cathode active material layer and a cathode current collector, a stack forming step of forming a laminate having a anode current collector, a separator, a cathode active material layer, and a cathode current collector in this order, and a pressing step of pressing the laminate. In addition, in the stack formation step, a green compact (second separator) of the above sulfide solid electrolyte may be disposed between the separator and the above cathode active material layer. The cathode formation step, the laminating step, and the pressing step may be conventionally known methods.

6. All Solid State Battery

Figure 2A:
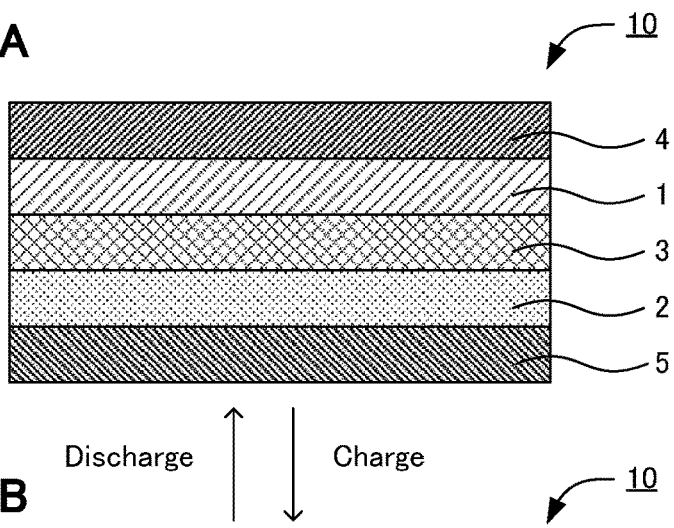
FIGS. 2A and 2B are schematic cross-sectional view illustrating an exemplary all solid state battery according to the present disclosure.
Figure 2B:
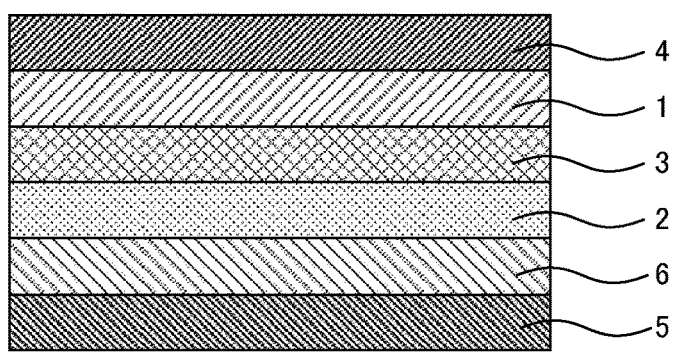

FIGS. 2A and 2B are schematic cross-sectional view illustrating an example of an all solid state battery in the present disclosure. All solid state battery 10 shown in FIG. 2A includes an anode current collector 5, a first separator 2, a second separator 3, a cathode active material layer 1, and a cathode current collector layer 4 in this order. The first separator 2 is a separator formed in the above-described separator formation step. All solid state battery 10 is a battery using a precipitation-dissolution reaction of metallic Li as an anode reaction. Therefore, as shown in FIG. 2B, in an all solid state battery 10, anode active material layers 6, which are deposited Li, are formed between anode current collector 5 and the first separators 2 by charge.

Materials of the cathode current collector, cathode active material layers and anode active material layers may be conventionally known. Since the anode current collector is the same as that described above, description thereof will be omitted here.

The all solid state battery may be a primary battery or a secondary battery, and among them, a secondary battery is preferable. This is because it may be charged and discharged repeatedly, and it is useful, for example, as an in-vehicle battery. Battery shapes may include, for example, coin-shaped, laminated, cylindrical and square-shaped, and the like.

Note that the present disclosure is not limited to the above embodiment. The above-mentioned embodiments are illustrative, and any one having substantially the same configuration as the technical idea described in the claims in the present disclosure and exhibiting the same operation and effect is included in the technical scope in the present disclosure.

EXAMPLES

Example 1

(Form of Separator)

Sulfide glass ($Li_6PS_5Cl_1$) was synthesized by weighing $Li_2S$, $P_2S_5$ and LiCl as starting materials and mechanically ball milling them. 400 mg of this sulfide glass was charged into a glass bottle, to which ethanol was added dropwise so that the solid content was 10 wt % and stirred for 3 minutes. Thus, a yellow transparent solution (liquid composition) was obtained. This liquid composition was applied onto a Cu foil (anode current collector) using a 100 μm-gap SUS blade to form a coating layer. This coating layer was dried in a glove box at 60° C. for 1 hours. Thereafter, it was dried in vacuo at 120° C. for 10 minutes. As a result, a member having an anode current collector and a separator thin film (11.7 micrometers thick) was obtained.

(Forming a Cathode)

As a cathode material, cathode active material ($LiNi_{1/3}Mn_{1/3}Co_{1/3}O_2$), the above sulfide glass, and an electrical material (VGCF-H: Showa Denko K.K.) were prepared. These were weighed to a total 2 g in a volume ratio of 78:19:3 and mixed. To this mixture, 1200 mg of butyl butyrate and 20 mg of PVDF binder were added and disintegrated in an ultrasonic homogenizer. Thus, a cathode slurry was produced. Cathode slurries were coated onto an Al-foil (cathode current collector) using a 300-μm-gap SUS blade. Thereafter, it was dried at 100° C. for 1 hour. This gave a cathode with cathode layers and a cathode current collector.

(Production of all Solid State Battery)

100 mg of the above sulfide glasses were weighed and put into cylindrical cylinders with a diameter of 11.28 mm and pressure-molded at 1 ton. Thus, electrolyte pellets were prepared. A cathode layer was placed on the upper surface of the pellet (second separator), and a separator (first separator) was pressed at 6 tons on the lower surface. Thus, an all solid state battery was produced. The produced all solid state battery was restrained by 3 MPa. When the above-mentioned sulfide glasses, active materials, and conductive materials were handled, the operation was carried out in a glove box in which the dew point was adjusted to −70° C. or less in an Ar-gas atmosphere.

Example 2 to 7

Starting materials and their percentages were adjusted so that sulfide glass ($Li_{7-a}PS_{6-a}X_a$) had the composition shown in Table 1. In addition, liquid compositions were prepared so that the solid fraction became a numerical value shown in Table 1. Liquid composition was coated on the anode current collector so that the thickness of the separator (first separator) became the value shown in Table 1. Except for these, an all solid state battery was produced in the same manner as in Example 1.

Comparative Example 1

An all solid state battery was produced in the same manner as in Example 1 except that the separators were formed as described below. First, sulfide glasses were synthesized in the same manner as in Example 1. This sulfide glass and ABR binder were weighed to a total 1 g in a volume ratio of 98:2 and mixed. To this, 2000 mg of heptane was added and crushed by an ultrasonic homogenizer to prepare a slurry. The slurry was coated on a Cu foil with a 100 m gap SUS blade and dried at 100° C. for 1 hour. By this, the separator thin film of 15 m thickness was obtained.

Comparative Example 2

The solid fraction of the liquid composition and the thickness of the separator were changed as shown in Table 1. Except for this, an all solid state battery was produced in the same manner as in EXAMPLE 1.

Comparative Example 3 and 4

The solid fraction of the liquid composition and the thickness of the separator were changed as shown in Table 1. Except for this, an all solid state battery was produced in the same manner as in Example 7.

[Evaluation]

(Filling Rate)

The filling ratio of the separators produced in Examples 1 to 7 and Comparative Examples 1 to 4 was determined by the following method. First, weighed separator was charged into a cylindrical cylinder having φ11.28 mm, and restrained at 3 MPa. The thickness of the separator at this time was measured by a film thickness meter. Next, the apparent density of the separator was calculated from the area, thickness and mass of the produced separator (apparent density of the separator=mass/(thickness×area)). The true density of the separator was then calculated from the true density and content of the components of the separator (sulfide glasses). (True density of separators=mass/sulfide glass content/True density of sulfide glass). The ratio of the apparent density to the true density was defined as the filling ratio (%). The results are shown in Table 1 and FIG. 3A.

(Capacity Maintenance Ratio)

The all solid state battery prepared in Examples 1 to 7 and Comparative Examples 1 to 4 were connected to a charge/discharge tester and cycled at 2.8-4.3 V and 0.1 C while being maintained at 25° C. The number of cycles was 10. The capacity retention rate at the tenth cycle was calculated. The results are shown in Table 1 and FIG. 3B.

TABLE 1

|  | Thickness (μm) | Solid fraction (wt %) | $Li_{7-a}PS_{6-a}X_a$ | | Filling ratio (%) | Capacity retention ratio (%) |
|---|---|---|---|---|---|---|
|  |  |  | X | a |  |  |
| Comp. Example 1 | 15.0 | — | Cl | 1 | 87.3 | 46.2 |
| Comp. Example 2 | 11.2 | 5 | Cl | 1 | 89.4 | 55.7 |
| Example 1 | 11.7 | 10 | Cl | 1 | 93.7 | 74.6 |
| Example 2 | 10.4 | 10 | I | 1 | 94.4 | 77.1 |
| Example 3 | 12.5 | 10 | I | 2 | 96.3 | 82.2 |
| Example 4 | 11.3 | 20 | I | 1 | 97.7 | 88.1 |
| Example 5 | 11.2 | 20 | I | 2 | 99.1 | 95.1 |
| Example 6 | 11.7 | 30 | I | 1 | 94.1 | 75.6 |
| Example 7 | 10.4 | 30 | I | 2 | 95.7 | 83.3 |
| Comp. Example 3 | 12.5 | 40 | I | 2 | 85.9 | 67.9 |
| Comp. Example 4 | 11.3 | 50 | I | 2 | 80.6 | 57.3 |

Figure 3A:
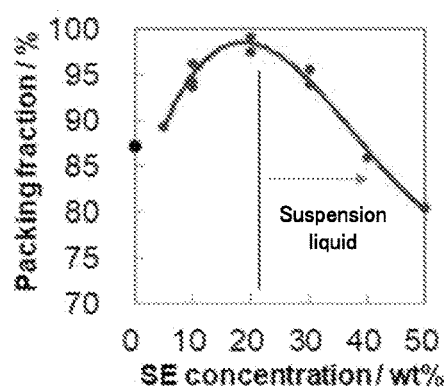
FIGS. 3A and 3B are graphs showing the relationship between the solid fraction and the filling ratio and the capacity retention ratio in the examples and comparative examples.
Figure 3B:
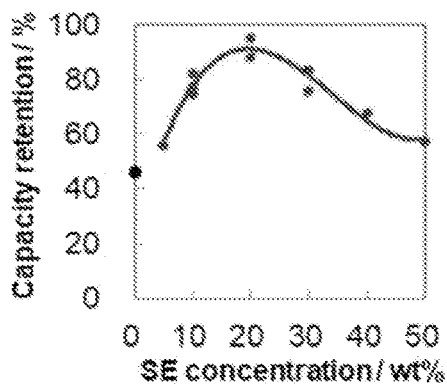

As shown in Table 1 and FIGS. 3A and 3B, the filling ratio and the capacity retention ratio of Examples 1 to 7 were improved as compared with Comparative Examples 1 to 4. In particular, in Examples 4 and 5 having a solid fraction of 20 wt %, the filling ratio and the capacity retention ratio were particularly good. This is presumably a saturated concentration of sulfide solid electrolyte in the vicinity of a solid fraction of 20 wt %. On the other hand, in Comparative Example 2 in which the solid fraction was 5 wt %, the filling ratio and the capacity retention ratio were low. This is considered to be due to the fact that the amount of the alcohol-based solvent increased relative to each other, so that voids were generated when the alcohol-based solvent was removed in drying. In addition, in Comparative Examples 3 and 4 in which the solid fraction exceeded 30 wt %, the filling ratio was remarkably lowered. This is considered to be because the amount of sulfide glass which was not dissolved in the liquid composition was large, and the particles of the glass were incorporated into the separator thin film, thereby causing grain boundaries and voids of the particles themselves. Further, it was confirmed that the higher the halogen content in sulfide glasses, the higher the filling ratio and the maintaining ratio, and it was confirmed that the filling ratio and the maintaining ratio are improved in the same manner when the halogen species is changed from Cl to I. This is considered to be because the densification of the separators was further promoted by increasing the true density of sulfide glass and decreasing the Young's modulus of the glass by adding I.

Example 8

Sulfide glass ($Li_6PS_5Cl_1$) was synthesized by weighing $Li_2S$, $P_2S_5$ and LiCl as starting materials and mechanically ball milling them. 400 mg of this sulfide glass was charged into a glass bottle, to which ethanol was added dropwise so that the solid content was 20 wt % and stirred for 3 minutes. Thus, a yellow transparent solution (liquid composition) was obtained. This liquid composition was applied onto a Cu foil (anode current collector) using a 100 m-gap SUS blade to form a coating layer. This coating layer was dried in a glove box at 60° C. for 5 minutes. Thereafter, it was dried in vacuo (0.01 atm) at 120° C. for 10 minutes. As a result, a separator thin film (10 micrometers thick) on an anode current collector was obtained.

Example 9

A separator thin film was obtained in the same manner as in Example 8 except that the conditions of drying the coating layer was changed to 2 hours at 25° C. in a glove box having Ar flow atmosphere (normal pressure).

Examples 10 to 14

A separator thin film was obtained in the same manner as in Example 9 except that the drying temperature was changed to those shown in Table 1.

[Evaluation]

(Filling Ratio and Li Ion Conductivity)

The filling ratio of the separators produced in Examples 8 to 14 was determined by the following method. First, weighed separator was charged into a cylindrical cylinder having φ11.28 mm, and restrained at 3 MPa. The thickness of the separator at this time was measured by a film thickness meter. Next, the filling ratio was calculated from the area, thickness and mass of the produced separator. The results are shown in Table 2 and FIG. 4. Next, the restrained separator was connected to a potentiostat (VMP from Bio-logic) having a Frequency Response Analyzer (FRA), and impedance was measured while maintaining 25° C. so as to obtain Cole-Cole plot. The point where the obtained electron blocking spectrum crossed the real axis was regarded as an ion conduction resistance, and the ion conductivity was calculated from that resistance and the thickness of the separator. The results are shown in Table 2 and FIG. 5.

(Solvent Residue)

The solvent residue amount of the separator produced in examples 8 to 14 was determined from the following method. First, the separator was scraped by a spatula, so as to obtain 10 mg to 20 mg powder. The obtained powder was placed in an Al pan, the surface thereof was smoothed, and simultaneous thermogravimetry/differential thermal analysis (TG-DTA) was conducted thereto. The temperature rising speed was 10° C./min, the measurement temperature was 25° C. to 150° C., and the atmosphere was Ar flow. In the TG curve, weight due to the evaporation of ethanol that appears in the vicinity of 80° C. was calculated and determined as the solvent residue after drying. The results are shown in Table 2 and FIG. 4.

TABLE 2

| | Drying pressure (atm) | Drying temperature (° C.) | Drying time | Solvent residue (wt %) | Filling ratio ( % ) | Li ion (mS/cm) |
|---|---|---|---|---|---|---|
| Example 8 | 1 | 60 | 5 min | 0.47 | 93.7 | 0.12 |
| | 0.01 | 120 | 10 min | | | |
| Example 9 | 1 | 25 | 2 hours | 5.1 | 98.4 | 0.018 |
| Example 10 | 1 | 40 | 2 hours | 2.1 | 98.8 | 0.11 |
| Example 11 | 1 | 60 | 2 hours | 0.51 | 98.7 | 0.40 |
| Example 12 | 1 | 80 | 2 hours | 0.53 | 98.9 | 0.38 |
| Example 13 | 1 | 100 | 2 hours | 0.44 | 94.1 | 0.29 |
| Example 14 | 1 | 120 | 2 hours | 0.41 | 92.4 | 0.24 |

As shown in Table 2, in example 8, the solvent residue after drying reached at 0.47 wt %, and thus it is presumed that the solvent was almost completely (substantially) removed. On the other hand, compared to example 8, the filling ratio of examples 9 to 12 was extremely high which was 98% or more. It is presumably because vacuum drying caused the solvent to vaporize rapidly, and the solvent escaped while creating voids and defects in the separator in example 8, and the solvent vaporized slowly due to atmospheric drying, and the solvent escaped without creating voids and defects in the separator in examples 9 to 12. Further, particularly in examples 11 and 12, the filling ratio reacted at about 99%, and the Li ion conductivity also almost matched the value shown in the document (Journal of Power Sources Volume 389, 15 Jun. 2018, Pages 140-147) where synthesis was conducted by a solid phase method.

Figure 4:
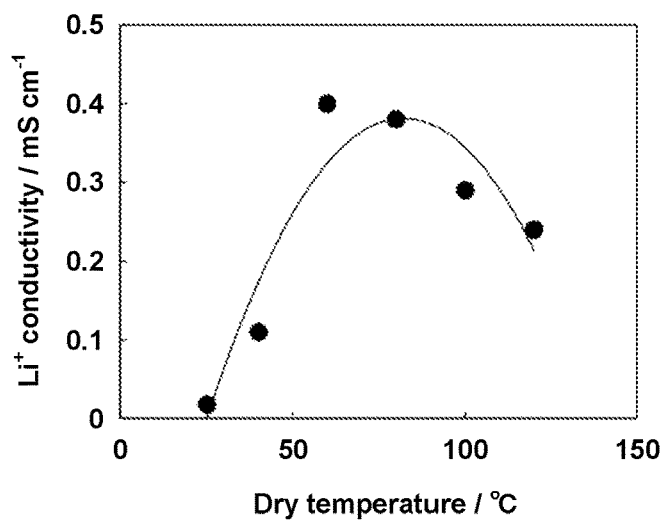
FIG. 4 is a graph showing the relationship between the drying temperature and the ion conductivity in the examples.
Figure 5:
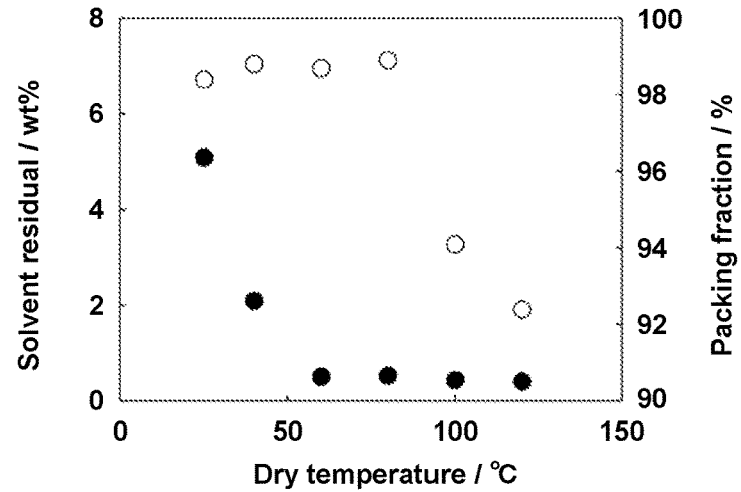
FIG. 5 is a graph showing the relationship among the drying temperature, the solvent residue, and the filling ratio.

Furthermore, the solvent residue in examples 9 and 10 was significantly more than that of examples 11 to 14. It is presumably because the drying temperature was low and the removement of solvent did not sufficiently proceed. As shown in FIG. 4 and FIG. 5, when the drying temperature was low, although the filling ratio was high, the solvent residue was more and the Li ion conductivity was low. On the other hand, in examples 11 to 14, the solvent residue dropped to the same as example 8 (vacuum drying), and the solvent was almost completely removed. However, as shown in FIG. 4 and FIG. 5, when the drying temperature was 100° C. or more, decreases in filling ratio and Li ion conductivity were confirmed. This is presumably because bumping of ethanol (boiling point: 78° C.) became dominant when the drying temperature was 100° C. or more, and the flow rate when the solvent vapor escaped from the separator increased to generate voids and defects. From these points, it was confirmed that drying at a normal pressure is effective for improving the filling ratio, and that the drying temperature on that occasion is preferably around the boiling point of the solvent.

DESCRIPTION OF SYMBOLS

1 . . . cathode active material layers
2 . . . first separator
3 . . . second separator
4 . . . cathode current collector
5 . . . anode current collector
6 . . . anode active material layers
10 . . . all solid state battery

What is claimed is:

1. An all solid state battery utilizing a precipitation-dissolution reaction of metallic Li as a reaction of an anode, obtained by a process comprising:
   a preparation step of preparing a sulfide solid electrolyte represented by $Li_{7-a}PS_{6-a}X_a$ (X is at least one of Cl, Br, and I, and a satisfies $0 \leq a \leq 2$),
   a liquid composition preparation step of dissolving the sulfide solid electrolyte in an alcohol-based solvent to prepare a liquid composition,
   a coating layer formation step of applying the liquid composition to an anode current collector to form a coating layer, and
   a separator formation step of forming a separator by volatilizing the alcohol-based solvent from the coating layer by drying, wherein
   the proportion of the sulfide solid electrolyte contained in the liquid composition is 10% by weight or more and 30% by weight or less, and
   a thickness of the separator is 0.5 μm-15 μm.

2. The all solid state battery according to claim 1, wherein a filling ratio of the separator is 92% or more.

3. The all solid state battery according to claim 1, wherein a filling ratio of the separator is 94% or more.

* * * * *